United States Patent
Low et al.

[15] 3,698,385
[45] Oct. 17, 1972

[54] REACTION TESTER
[72] Inventors: George M. Low, Deputy Administrator of the National Aeronautics and Space Administration with respect to an invention of; Harry H. Brown, 3012 Potshop Road, Norristown, Pa. 19401

[22] Filed: Oct. 7, 1970
[21] Appl. No.: 78,717

[52] U.S. Cl..................128/2 N, 35/22 R, 273/1 E
[51] Int. Cl. .............................................A61b 5/16
[58] Field of Search..........128/2 R, 2 O, 2 N, 2.05 P; 273/1 E; 35/11, 22

[56] References Cited

UNITED STATES PATENTS

| | | | |
|---|---|---|---|
| 2,678,692 | 5/1954 | Ranseen | 128/2 R X |
| 3,359,975 | 12/1967 | Sherman | 128/2 O |
| 3,200,814 | 8/1965 | Taylor et al. | 128/2 R |
| 3,322,115 | 5/1967 | Richards | 128/2 R |
| 3,503,608 | 3/1970 | Ylinen | 273/1 E |
| 3,563,230 | 2/1971 | Gibbs et al. | 128/2 R |

FOREIGN PATENTS OR APPLICATIONS

| | | | |
|---|---|---|---|
| 195,038 | 11/1967 | U.S.S.R. | 128/2 R |
| 1,165,136 | 9/1969 | Great Britain | 128/2 R |

Primary Examiner—Kyle L. Howell
Attorney—Russell E. Schlorff, Marvin F. Matthews and John R. Manning

[57] ABSTRACT

A reaction tester is disclosed for testing the simple and disjunctive reaction of a subject to light stimuli. The embodiment disclosed is in the form of a bar member which has spaced grooves for receiving the index fingers of a subject. Near the bottom of each groove are openings aligned along a transverse axis to a groove and a light beam is projected through the openings to a photo transistor. The subject's finger breaks the light beam and when the finger is moved relative to the groove, the light beam actuates the transistor. A logic circuit is provided to interconnect the "reaction key," above defined, to a panel having neon light indicators. A "ready," "left" and "right" neon light indicators are selectively actuatable. The "ready" light informs the subject that the test will begin. Next, either the "left" or "right" or both lights are actuated through the logic circuit. A counter is started and when the subject reacts by moving the correct finger, the light indicator is extinguished and the counter is stopped. An incorrect reaction causes an error indicator to operate.

10 Claims, 3 Drawing Figures

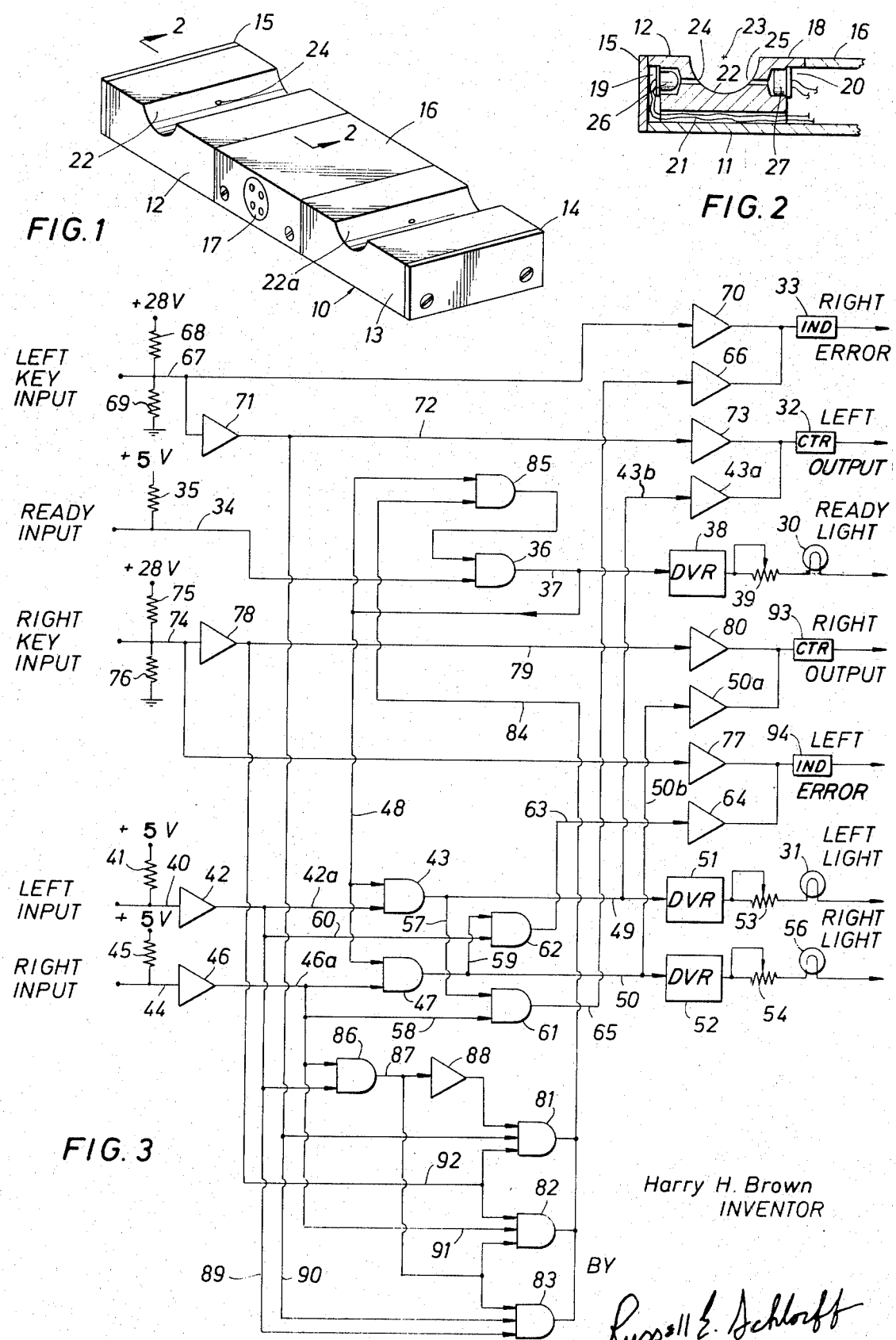

3,698,385

REACTION TESTER

ORIGIN OF THE INVENTION

The invention described herein was made in the performance of work under a NASA Contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

This invention relates to a reaction tester and, more particularly, to a system for measuring the simple and disjunctive reaction time to a light stimuli. A reaction key utilizes the principles of light beam sensing which has a fast time response to operate a logic circuit which provides outputs indicative of reaction time and reaction errors.

2. Description of the Prior Art

Heretofore, reaction testing devices have been employed for testing reaction to sound or change in sound; testing for muscular reactions and measuring with an accelerometer or motion sensing devices attached to a subject. Still another category of testing devices is found in amusement devices. In this regard, manual dexterity devices usually depend upon the steadiness of hand. Where response time is measured, mechanical and other devices with unusually long reaction times are utilized.

None of these devices solve the problem of measuring extremely fast reaction times and are not directed to measuring response to light stimuli.

SUMMARY OF THE INVENTION

Accordingly, it is an object of this invention to provide a fast reaction device which can measure the simple and disjunctive response of a subject to light stimuli.

Briefly stated, the invention contemplates a reaction key which utilizes a light beam. The subject's finger intersects the light beam and the response is measured by movement of the finger to complete the light beam circuit to a photo transistor. An indicator panel has "ready," "left" and "right" neon light indicators and a subject is forewarned of a test when the "ready" light is illuminated. Through logic circuitry, either the "left" or "right," or both, lights are illuminated. At the time a light is actuated, a counter is actuated. When the subject correctly responds, the light is extinguished and the counter stopped. An incorrect response actuates an error indicator which holds until the correct response is made. The logic circuitry includes electronic circuits which are preconditioned and intercoupled to accomplish the foregoing functions.

BRIEF DESCRIPTION OF THE DRAWING

Reference to the drawing will further explain the invention wherein like numerals refer to like parts, and in which:

FIG. 1 is a view in perspective of a reaction key embodying the present invention;

FIG. 2 is a view in cross section taken along line 2—2 of FIG. 1; and

FIG. 3 is a schematic representation of the logic circuitry for the reaction tester of the present invention.

DESCRIPTION OF THE PREFERRED EMBODIMENT

Referring now to FIGS. 1 and 2, the reaction key 10 includes a rectangularly shaped base 11 on which spaced key blocks 12 and 13 are mounted and attached thereto by screws (not shown). At each end are facing plates 14 and 15 which are attached by screws to the base 11. The center portion between the blocks 12 and 13 is enclosed by a channel member 16 which is attached to the base 11 by screws and has an electrical plug outlet 17 which permits connection to the electronic circuitry. In the upper surface of the key 10 are spaced grooves 22 and 22a for receiving a subject's index finger.

A key block 12 as shown in FIG. 2 has an upper surface 18 and side recesses 19 and 20 for accommodating electrical wiring. A channel recess 21 is located in the bottom of the block to accommodate electrical wiring. In the upper surface 18 is a longitudinal, cylindrically shaped groove 22 with its axis 23 of radii located above the surface 18. The size of the groove is made adequate to accommodate a typically sized index finger. Near the bottom of the groove 22 are openings 24 and 25 which are aligned with one another along an axis transverse to axis 23. Opening 24 is connected to a recess in block 12 which is sized to receive an incandescent bulb 26. Opening 25 is connected to a recess in blocks 12 which is sized to receive a photo transistor 27. Bulb 26 emits light through openings 24 and 25 to photo transistor 27 which produces an electrical response. When the light beam is interrupted by a subject's finger, a different electrical response is produced. Groove 22a has a similar construction and arrangement as groove 22. As will be apparent from the discussion to follow the different responses which may be characterized as a "0" and "1" logic signals operate the logic circuit to provide indications of the correct response and the response time.

With respect to the electrical logic circuit depicted in FIG. 3, there are 5 inputs labeled as follows: a READY input, a LEFT input, a RIGHT input, a LEFT KEY input, and a RIGHT KEY input. The LEFT and RIGHT KEY inputs are provided from the reaction key as described with respect to FIGS. 1 and 2.

There are 7 possible outputs labeled as follows: a READY LIGHT, a LEFT LIGHT, a RIGHT LIGHT, a LEFT OUTPUT, a RIGHT OUTPUT, a LEFT ERROR and a RIGHT ERROR. The logic of the testing system is designed so that a logic signal applied to READY input operates the READY LIGHT 30, and conditions the logic circuit. If a LEFT INPUT is selected by applying an appropriate logic signal, the LEFT LIGHT 31 is turned on and the output signal from LEFT OUTPUT actuates a timing counter 32. If the subject correctly actuates the LEFT KEY by moving his finger, a logic signal is applied to the LEFT KEY INPUT and the READY LIGHT 30 and LEFT LIGHT 31 are extinguished and the counter 32 turned off. The reaction time is measured by the counter 32. If the subject incorrectly actuates the RIGHT KEY by moving his right finger, a logic signal is applied to the RIGHT KEY INPUT and the READY LIGHT and LEFT LIGHT remain on and a logic signal from the RIGHT ERROR output actuates a noise indicator 33 which operates until the correct LEFT KEY is actuated. The system operates similarly where the RIGHT INPUT is selected. It is also possible to select both the RIGHT and LEFT INPUTS to operate both lights and require actuation of both keys.

The READY INPUT circuit includes a 5-volt potential coupled to an input line 34 via a resistor 35. The input line 34 is coupled to one input of a READY NAND circuit 36 which has its output coupled via a conductor 37 to a lamp driver 38 which, in turn, is coupled via a potentiometer 39 to the READY LIGHT 30. When a logic "0" signal input is applied to NAND circuit 36, a logic "1" signal output is provided to the lamp driver 38 which energizes the light 30 and informs the subject that a test will follow.

The LEFT INPUT circuit includes a 5-volt potential coupled to an input line 40 via a resistor 41. The input line 40 is coupled via an inverting amplifier 42 and conductor 42a to one input of NAND circuit 43. The RIGHT INPUT circuit similarly includes a 5-volt potential coupled to an input line 44 via a resistor 45. The input line 44 is coupled via an inverting amplifier 46 and conductor 46a to one input of NAND circuit 47. A conductor 48 couples the output of the READY NAND 36 to the other inputs of NAND 43 and 47. Thus the READY NAND 36 conditions NANDs 43 and 47 so that a logic "0" signal input from either the LEFT or RIGHT INPUTS, or both, will selectively operate the NANDs 43 and 47. The output of NANDs 43 and 47 are respectively coupled via conductors 49 and 50 to lamp driver circuits 51 and 52 which are coupled via potentiometers 53 and 54 to the LEFT LIGHT 31 and RIGHT LIGHT 56, respectively. The output of NAND 47 is also coupled to an inverting amplifier 50a to the RIGHT OUTPUT via a conductor 50b. The RIGHT OUTPUT includes a counter 93. The output of NAND 43 is also coupled to an inverting amplifier 43a in the LEFT OUTPUT via a conductor 43b.

The output of NAND 43 and the RIGHT INPUT are coupled to an ERROR NAND 61 via conductors 57 and 58 while the inputs of an output of NAND 47 and the LEFT INPUT are coupled via conductors 59 and 60 to inputs of an ERROR NAND 62. Thus, both LEFT and RIGHT INPUTS are coupled to the ERROR NANDs 61 and 62. ERROR NAND 62 is coupled via a conductor 63 and inverting amplifier 64 to the LEFT ERROR while ERROR NAND 61 is coupled via a conductor 65 and an inverting amplifier 66 to the RIGHT ERROR output. In the LEFT ERROR output circuit is an error indicator 94.

The LEFT KEY INPUT includes a 28-volt potential coupled to an input line 67 via a resistor 68 and has a resistor 69 coupled to a reference ground. The conductor 67 is coupled directly to the RIGHT ERROR OUTPUT via an inverting amplifier 70 and also coupled to an inverting amplifier 71 which, in turn, is coupled via a conductor 72 and another inverting amplifier 73 to the LEFT OUTPUT.

The RIGHT KEY INPUT includes a 28-volt potential coupled to an input line 74 via a resistor 75 and has a resistor 76 coupled to a reference ground. The conductor 74 is coupled directly to the LEFT ERROR OUTPUT via an inverting amplifier 77 and also is coupled to an inverting amplifier 78 which, in turn, is coupled via a conductor 79 and another inverting amplifier 80 to the RIGHT OUTPUT.

In operation, assuming the actuation of the READY LIGHT, if the LEFT INPUT is operated, the left LIGHT 31 is turned on and a signal is provided to the LEFT OUTPUT which actuates a counter or timer 32. If the subject correctly operates the LEFT KEY, a signal is applied to the LEFT OUTPUT which stops the timer 32. If the subject incorrectly operates the RIGHT KEY, a signal is supplied to the LEFT ERROR output and an indicator 94, such as a buzzer, is operated until the correct LEFT KEY is operated. A test for the RIGHT KEY response operates in a similar manner. Where both RIGHT and LEFT INPUTS are actuated, both the RIGHT and LEFT keys must be operated to prevent operation of an ERROR output and the timers will measure the individual responses for each channel.

A reset circuit is provided which includes NANDs 81, 82 and 83. The output of the NANDs is commonly coupled via a conductor 84 to an input of a NAND 85. As will be apparent, NANDs 36 and 85 are coupled to provide a multivibrator action when the signal to the READY INPUT turns the multivibrator on and a signal on conductor 84 can turn the multivibrator off.

In the reset circuit, both the LEFT and NAND INPUTS are coupled to a NAND 86 which has its output coupled via a conductor 87 and an inverting amplifier 88 to one input of NAND 81 and the output on conductor 87 is also coupled directly to inputs of NANDs 82 and 83. Thus, one input to NANDs is a combination of the LEFT and RIGHT INPUTS. NAND 83 also has inputs via conductors 89 and 90 from the LEFT INPUT and the LEFT KEY so that it operates on the combination of the LEFT INPUT and LEFT KEY. NAND 82 also has inputs via conductors 91 and 92 from the RIGHT INPUT and RIGHT KEY so that it operates on the combination of the RIGHT INPUT and RIGHT KEY.

The reset circuit is thus arranged to operate upon the receipt of a correct combination to turn off the multivibrator which, in turn, will extinguish the READY LIGHT and selected input light or lights.

In the circuitry shown in FIG. 3, the applicant has used logic amplifiers which are inverter types manufactured and sold by Motorola under the code MC836P. NAND circuits 36, 43, 47, 61, 62, 85, 86 are Motorola systems No. MC846P. Other NAND circuits 81–83 are Motorola systems No. MC863P. Lamp drivers 38, 51, 52 are used for the light include transistorized oscillators to provide a high voltage to ionize the lights which are neon bulbs. The lamp drivers are manufactured and sold by Fairchild as components SH2002P. The neon bulbs can be turned on in 30 and 50 microseconds.

The features of the invention are apparent but will be briefly summarized as follows: the light stimuli is turned-on with times of 50 microseconds or less and the intensity is controllable. An ordinary incandescent lamp has a turn-on time of approximately 50 milliseconds which can affect the reaction time since the subject might react to light stimuli at some intensity level before full brightness is reached. The time is also significant because a reaction time can be less than 200 milliseconds. The key used requires zero force and little physical movement and will react in 5 microseconds to eliminate errors in reaction time measurement. The logic of the tester also detects errors when performing disjunctive reaction measurements. Also, considering all delays in the logic, light stimuli turn-on time and time delays in the reaction key, the reaction time is measured with an uncertainty of less than 56 microseconds.

The operation of the apparatus may be briefly recapitulated as follows: A logic "0" signal is applied to the READY INPUT. This signal sets the NANDs 36 and 85 and turns on the ready light 30 so that the subject is informed that a trial test is being initiated. The intensity of the light 30 can be controlled by potentiometer 39. Next, a logic "0" signal is placed on either the LEFT INPUT, RIGHT INPUT, or both. These signals and the previously placed READY signal enable the appropriate left or right lights 31 or 56 to be illuminated. The intensity of lights 31 and 56 can be similarly controlled by potentiometers 53 and 54. When the left or right lights are illuminated, the counters 32 or 93, as the case may be, are started by a logic signal. At the same time, NANDs 43 and 47 are enabled so that signals from the reaction key can operate the counters.

When the subject activates the correct key, the output signals are supplied to the logic circuit and the counters measure the duration of the subject's reaction time. The signals also turn off the light indicators.

If the subject responds incorrectly, i.e., the right light is illuminated and the subject responds by removing his left finger, the logic circuit detects this error and an indication is provided by indicator 94 and the other indicators and reaction time signals are not turned off until a correct response is made.

Further modifications and alternative embodiments will be apparent to those skilled in the art in view of this description and accordingly, the foregoing specification is considered to be illustrative only.

What is claimed is:

1. A reaction tester for determining the simple and disjunctive reaction time of a subject to light stimuli comprising:
   stimuli for the subject,
   means initiating the stimuli,
   means measuring the length of time commencing with the initiation of the stimuli,
   key means including a support having at least one groove for receiving a digit of a subject,
   sensing means including aligned openings disposed along an axis transverse to the axis of said groove, and light means and a photo transistor detector means aligned with said openings to provide a light path interruptible by a digit, and
   means responsive to said detector means for obtaining an indication of time reaction when a digit is moved out of said light path.

2. The apparatus of claim 1 and further including spaced grooves in said support, light and photo transistor detector means for each of said grooves, and neon light indicating means responsive to operation of each of said detector means for indicating a time reaction.

3. The apparatus of claim 2 wherein said light means are incandescent lamps.

4. The apparatus of claim 3 wherein said indicating means is included in logic circuit means having a ready, neon light indication means and a left and right neon light indication means.

5. The apparatus of claim 4 and further including in the logic circuit means, a left input means and a right input means, and counter means actuatable by an input means and a detector means for determining the time response between the operation of a light stimuli and operation of a detector means.

6. The apparatus of claim 5 wherein said logic circuit further includes error circuit means operable in response to actuation of a non-selected detecting means for indicating an incorrect selection.

7. The apparatus of claim 6 wherein said logic circuit further includes reset means operable in response to selection of a correct detecting means for extinguishing the light indicator means and stopping the counter means.

8. The apparatus of claim 5 wherein said logic circuit further includes a flip-flop circuit in said ready light indication means which enables said left and right light indicator means.

9. The apparatus of claim 5 wherein said ready light indication means, said left and right light indication means respectively have intensity control means.

10. The apparatus of claim 6 wherein said logic circuit further includes a flip-flop circuit in said ready light indication means for enabling said left and right light indicator means and said error circuit means.

* * * * *